W. H. LEPREVOST.
POWER JACK.
APPLICATION FILED JULY 20, 1916.
1,275,450.
Patented Aug. 13, 1918.
2 SHEETS—SHEET 2.
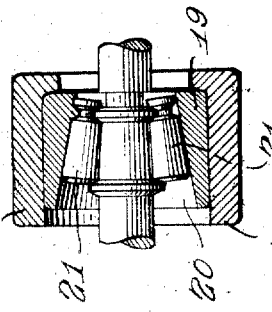
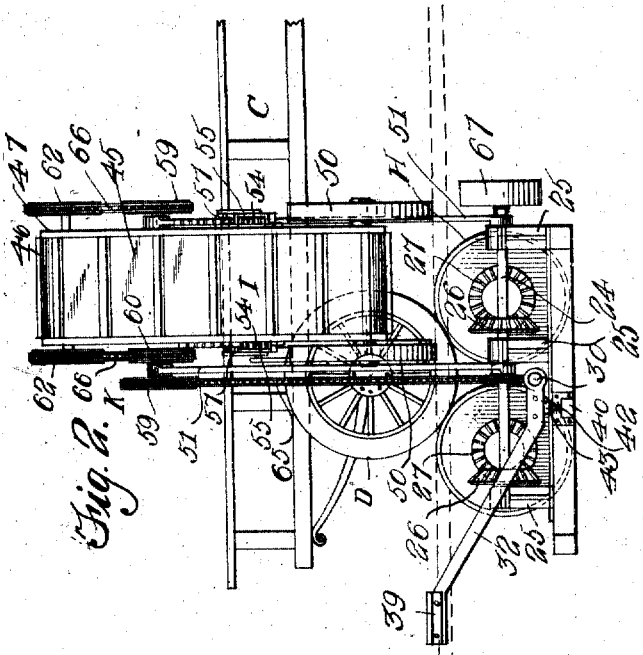
INVENTOR
William H. Leprevost
By Lancaster and Allwine
his ATTORNEYS

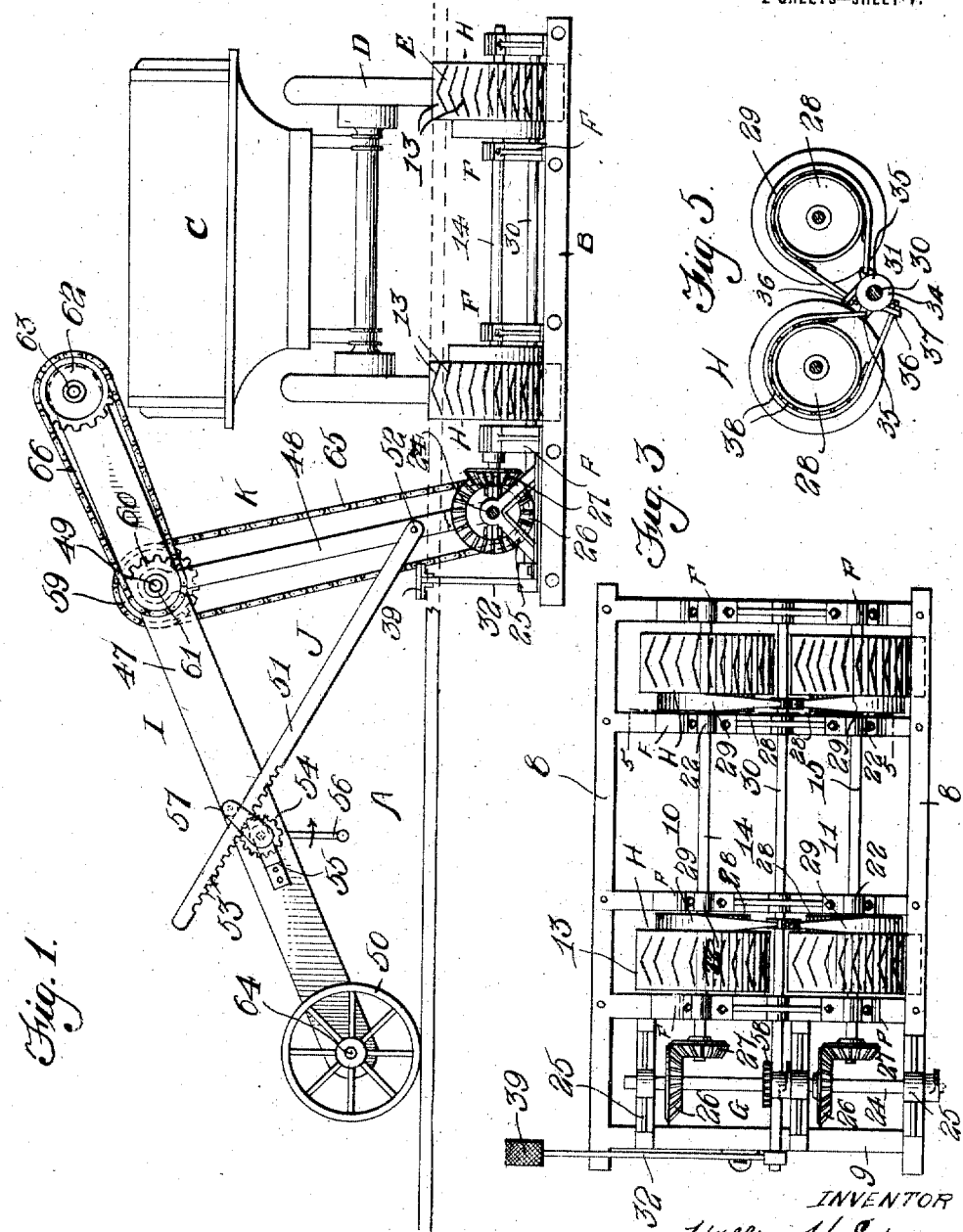

UNITED STATES PATENT OFFICE.

WILLIAM H. LEPREVOST, OF NILES, OHIO.

POWER-JACK.

1,275,450.  Specification of Letters Patent.  Patented Aug. 13, 1918.

Application filed July 20, 1916. Serial No. 110,358.

*To all whom it may concern:*

Be it known that I, WILLIAM H. LEPREVOST, a citizen of the United States, and resident of Niles, in the county of Trumbull and State of Ohio, have invented a certain new and useful Improvement in Power-Jacks, of which the following is a specification.

My present invention relates to mechanism for transmitting the energy developed by a motor vehicle, when the main mass is inert, to other mechanism rendering the motor vehicle susceptible of use as a stationary motive plant.

The principal objects of my invention are to provide energy transmission of the character described which will effectively support motor vehicles at the driving wheels, in such a manner that, during operation, the power transmission to said driving wheels may be utilized at a stationary place and in such a manner that the vehicle will not become displaced under ordinary conditions, and without placing undue strain upon the running gear of the vehicle; to provide energy transmission which may be utilized for loading or unloading the vehicle by use of motors of the vehicle itself; and, energy transmission by which the vehicle may be quickly moved out of operative relation to the transmission without stopping the motor, to make room for a following motor vehicle, thus facilitating operation, such as the loading of a plurality of vehicles in succession as is desirable in building construction where it is found desirable to quickly load or unload the building material.

Another object of my invention is to provide energy transmission embodying gearing which must be well lubricated, access being readily gained to said gears while the vehicle is in operative relation to said transmission.

Further objects of my invention will appear in the following detailed description, taken in connection with the accompanying drawings, forming a part of this specification, and in which drawings:

Figure 1 is an end elevation of energy transmission constructed according to my invention.

Fig. 2 is a side elevation of the same.

Fig. 3 is a top plan view of a portion of said transmission.

Fig. 4 is an enlarged detail view of a support.

Fig. 5 is a sectional view on the line 5—5 of Fig. 3.

Fig. 6 is an enlarged detail sectional view of an approved form of bearing.

Fig. 7 is an enlarged detail view partly in elevation and partly in vertical section of mechanism forming a part of control means of the transmission.

In the drawings, where similar characters refer to similar parts throughout the several views, A designates a floor; B a base below the level of said floor; C a motor vehicle including driving wheels D; E friction wheels supporting said vehicle C at wheels D; F means for supporting wheels E upon base B; G mechanism for causing said wheels to rotate in unison and in the same direction; H control means for wheels E; I an endless carrier; J instrumentality for positioning endless carrier I into operative relation to the vehicle C; and, K means for transmitting power from the vehicle C to endless carrier I.

The base B, which is disposed below the plane upon which the motor vehicle is driven, may be made up of longitudinal members 8 and transverse members 9, secured together in any suitable manner, and is preferably disposed so that the upper portions of the friction wheels E are substantially alined with the floor surface A.

As to the friction wheels E, they are arranged in two pairs designated 10 and 11, each set comprising two wheels in spaced relation laterally, the two sets of wheels being arranged with their axes of rotation in parallel relation with wheels of one set alined with wheels of the other set, and as is clearly shown in Fig. 3 of the drawings. When disposing the motor vehicle C in operative relation to the friction wheels E, the driving wheels D engage the circumference of wheels E in the hollow between coöperating wheels. It is preferred to provide a plurality of ribs 13 on the circumference of each wheel, said ribs extending from the side portions of the wheel and converging at substantially the central plane of the wheel, the ribs of all wheels converging in the same direction. The wheels of each set are spaced apart one from the other with their central planes at substantially the gage of the wheels of the motor vehicle, so that, as the driving wheels D are disposed in operative relation to the friction wheels E, and the former are rotated, the tendency will be to center the motor vehicle directly over the set of friction wheels, the tread of the driving wheels seeking engagement with the ribs 13 at their point of convergence. Even though the gage of the driving wheels D is smaller or greater than the gage of the wheels E, the tendency will be to maintain the motor vehicle centered over the set of friction wheels.

As to the means F for supporting friction wheels E, in the example shown, the wheels of set 10 are rigid with a shaft 14, while the wheels of set 11 are rigid with a shaft 15, the shafts 14 and 15 being supported by the means F which may comprise a beam 16 at each side of coöperating wheels E, each beam being provided with two two-part bearings 17, the one part 18 disposed with its concavity centered in a plane, designated by the line $x$—$x$ at substantially 45° to the horizontal, or base B, and the two planes converging above said base, as is clearly shown in Fig. 4 of the drawings. In the preferred construction, the bearing 17 includes an annulus 19 having a tapering bore 20, receiving a plurality of tapered rollers 21, which bear against the periphery of the shaft, it receives, as is clearly shown in Fig. 6 of the drawings, the annulus 19 being held in operative relation to the bearing part 18, as by a second part 22, secured to part 18, as by bolts 23.

Referring now to the mechanism for causing the wheels E to rotate in unison and in the same direction, it may comprise a shaft 24 disposed to one side of the sets of wheels 10 and 11, said shaft supported by bearings 25 and disposed with its longitudinal axis in a plane at a right angle to the axes of rotation of the wheels E; bevel gears 26 rigid with shaft 24, and co-meshing bevel gears 27 rigid with the shafts 14 and 15, as is clearly shown in Fig. 3 of the drawings. Thus, as movement is transmitted to driving wheels D in the direction indicated by the arrow in Fig. 2, the friction wheels E will rotate as indicated, which in turn transmit movement to shafts 10 and 11, and to shaft 24 through the co-meshing bevel gears, all friction rollers rotating in unison, and where the motor vehicle C embodies a differential permitting one wheel to rotate faster than the others, there is no danger of lost motion.

In order that movement of the friction wheels may be controlled, the means H is provided, which, in the example shown, comprises drums 28, one laterally of and adjacent each friction wheel E; flexible bands 29, one for each drum 28; a shaft 30, supported by base B and extending longitudinally of shafts 14 and 15; means 31 for connecting the bands 29 to shaft 30 so that circumferential movement of said shaft in one direction will draw said bands tightly about their respective drums, whereas, movement in a counter direction will relieve pressure of said bands upon said drums; a lever 32 for operating shaft 30; and, if desired, a device 33 for yieldably acting upon lever 32 to normally release bands 29 from pressure upon their respective drums. The means 31 may consist of a collar 34 between adjacent drums 28, and rigid with shaft 30, said collar provided with a plurality of extensions 35 to which one end of the bands are connected, and extensions 36 through which the other end portions of said bands extend, nuts 37 being provided to adjust the bands, and to take up wear. If desired, the internal faces of the bands may carry a plurality of wood or fiber blocks 38, which bear directly upon the drums 28. The lever 32 is preferably in the form of a foot lever, provided with a plate 39 normally disposed adjacent the floor surface A, while the device G may comprise a socket 40 rigid with base B, the bore 41 of which receives a pin 42 rigid with a saddle 43 upon which the lever 32 rests, an expansion spring 44 being interposed between the saddle 43 and the upper face of socket 40. Thus, when the lever 32 is depressed, the shaft 30 is moved circumferentially, as indicated by the arrow in Fig. 5, which tightens the bands 29 about their respective drums 28. When pressure upon the lever 32 is relieved, said lever responsive to device 33, moves upwardly rotating shaft 30 in a counter direction and relieving pressure upon the drums 28.

In the example shown, I have disclosed means for loading the motor vehicle C, utilizing its motor for such purpose, the means comprising the endless carrier I, instrumentality J, and means K hereinbefore referred to. The endless carrier I may be of any suitable type, such as a flexible band 45 provided with a plurality of transverse slots 46. The instrumentality J may comprise a frame 47 supporting carrier I; links 48 pivotally connected with frame 47 as at 49 and oscillatable about the axis of shaft 24; wheels 50 at the end portion of frame 47 remote from the pivotal connection of links 48 with said frame; draw bars pivotally connected with links 48 as at 52, and provided with a plurality of teeth 53 at their free ends; gears 54 co-meshing with teeth 53 and carried by brackets 55, said gears being rotatable in unison as by cranks 56; and, a keeper 57 for retaining the draw bar in operative relation to its respective gear 54. Thus, by rotating the cranks 56 in the direction indicated by the arrow, the links 48 are swung so as to change their angular position with respect to frame 47, positioning the egress end of carrier I above the motor vehicle C. If the crank 56 is rotated in a counter direction, the frame 47 moves away from vehicle C, being supported at its one end by wheels 50 and at its other end portion by links 48.

Referring now to means K, it may comprise a sprocket 58, rigid with shaft 24; a sprocket wheel 59 carried by frame 47 with its axis of rotation coincident with the axis of oscillation of links 48 at said frame; sprockets 60 rotatable with sprocket 59 as through shaft 61, sprockets 62 carried by frame 47 at the upper end portion; and, shafts 63 and 64 about which endless carrier I is trained, the shaft 63 being rigid with sprockets 62, a chain 65 being trained about sprockets 58 and 59, while chain 66 is trained about the sprockets 60 and 62.

The operation of the transmission is as follows:—

Upon the approach of the motor vehicle toward the transmission, the operator depresses lever 32 which retains the friction wheels E against rotation. As soon as the motor vehicle is in operative relation to the sets of friction wheels, motion is transmitted to the driving wheels D, which transmit movement to the shafts 14 and 15, which rotate in unison, and impart movement to shaft 24. This latter shaft may be provided with a pulley 67, from which power may be transmitted to suitable tools or machines, (not shown in the drawings).

Where the transmission includes means for loading or unloading the vehicle, after the vehicle is in operative relation to the transmission, the crank 56 may be rotated as hereinbefore described, positioning the egress end of the carrier directly above the body of vehicle C, and material may be disposed upon the endless carrier I which is delivered to the vehicle body. Should the motor vehicle be backed upon the transmission to assume a position opposite to that shown in Fig. 2, the endless carrier will be so rotated as to deliver any material placed thereupon from the vehicle body C to a stationary point adjacent the wheels 50.

As soon as the vehicle C is loaded or unloaded, the speed may be reduced, and the operator has merely to depress lever 32, restraining movement of friction wheels E and the motor vehicle C will move out of operative relation to the transmission, and be in readiness to receive the following vehicle.

Changes in details may be made without departing from the spirit or scope of my invention; but,

I claim:—

1. In a power jack of the character described, two sets of friction wheels, each set comprising two wheels in spaced relation laterally, and said sets arranged to have their axes of rotation in parallel relation with wheels of one set alined with wheels of the other set, each wheel provided with a plurality of ribs on its circumference, said ribs extending from the side portions of the wheel and converging at substantially the central plane of the wheel, and the ribs of all wheels converging in the same direction.

2. In a power jack, the combination of two sets of friction wheels, each set comprising two wheels in spaced relation laterally, and said sets arranged with their axes of rotation in parallel relation, with wheels of one set arranged in alinement with wheels of the other set, a base, a shaft rigid with the wheels of each set, and means for supporting said shafts of said wheels from said base, said means including a beam at each side of coacting alined wheels, and two two-part bearings rigid with said beams, one bearing disposed with its front concavity centered in a plane substantially 45° to the horizontal, and the said planes of said bearings converging above said base.

3. In a power jack of the character described, the combination of a base, two sets of friction wheels each set comprising two wheels in spaced relation laterally and said sets arranged with their axes of rotation in parallel relation with wheels of one set alined with wheels of the other set, a shaft rigid with the wheels of each set, means for supporting said shafts from said base, a third shaft to one side of said sets of wheels, and lying in a plane at a right angle to the axes of the latter, and bevel gears carried by said shafts to cause the said shafts of said wheels to rotate in unison and in the same direction.

4. In a power jack of the character described, the combination of a base, two sets of friction wheels, each set comprising two wheels in spaced relation laterally and said sets arranged with their axes of rotation in parallel relation with wheels of one set alined with wheels of the other set, a shaft rigid with the wheels of each set, means for supporting said shafts from said base, a third shaft to one side of said sets of wheels, and lying in a plane at a right angle to the axes of the latter, bevel gears carried by said shaft to cause the said shafts of said wheels to rotate in unison and in the same direction, and a transmission wheel on said third shaft.

5. In a power jack of the character described, the combination of a base, two sets of friction wheels, each set comprising two wheels in spaced relation laterally and said sets arranged with their axes of rotation in parallel relation with wheels of one set alined with wheels of the other set, a shaft rigid with the wheels of each set, means for supporting said shafts from said base, means for causing said shafts to rotate in unison and in the same direction, a drum adjacent each friction wheel rigid with its respective shaft, a third shaft parallel with the first shafts between the same and supported by said base, bands about said drums and operatively connected with said shaft to be drawn tightly about said drums when said shaft is moved circumferentially in one direction and to release said bands when said shaft is rotated in a counter direction, and means for operating said third shaft.

6. In a power jack of the character described, the combination of a base, two sets of friction wheels, each set comprising two wheels in spaced relation laterally, and said sets arranged with their axes of rotation in parallel relation, with the wheels of one set alined with the wheels of the other set, a shaft rigid with the wheels of each set, means for supporting said shafts from said base, means for causing said shafts to rotate in unison in the same direction, a drum laterally of each friction wheel of each set and rotatable therewith, a third shaft parallel to said first shafts, between the same and supported by said base, bands about said drums and operatively connected with said shafts to be drawn tightly about said drums when said shaft is moved circumferentially in one direction, and to relieve said bands when said shaft is rotated in a counter direction, and means for operating said third shaft.

7. In a power jack, the combination of a base, two sets of friction wheels, each set comprising two wheels in spaced relation laterally, and said sets arranged with their axes of rotation in parallel relation with the wheels of one set alined with the wheels of the other set, a shaft rigid with the wheels of each set, means for supporting said shafts from said base, means for causing said shafts to rotate in unison in the same direction, a drum arranged laterally of each friction wheel of each set and rotatable therewith, a brake shaft arranged in parallelism and between the shafts of said wheels, bands secured at opposite ends to said brake shaft and encircling the adjacent bands and means for rocking said brake shaft in one direction to simultaneously bind all of said bands about the drums and in the other direction to simultaneously release all of said drums.

WILLIAM H. LEPREVOST.